United States Patent
Xu et al.

(10) Patent No.: US 11,976,244 B2
(45) Date of Patent: May 7, 2024

(54) SYSTEM AND METHODS FOR RENEWABLE FUELS

(71) Applicant: EXXONMOBIL TECHNOLOGY AND ENGINEERING COMPANY, Annandale, NJ (US)

(72) Inventors: Xiaochun Xu, Basking Ridge, NJ (US); Yunming Fang, Beijing (CN); Yudi Zhao, Beijing (CN)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 18/064,136

(22) Filed: Dec. 9, 2022

(65) Prior Publication Data

US 2023/0183586 A1 Jun. 15, 2023

Related U.S. Application Data

(60) Provisional application No. 63/265,301, filed on Dec. 13, 2021.

(51) Int. Cl.
*C10G 69/04* (2006.01)
*C10G 1/06* (2006.01)
(Continued)

(52) U.S. Cl.
CPC ............... *C10G 69/04* (2013.01); *C10G 1/06* (2013.01); *C10G 3/40* (2013.01); *C10G 3/52* (2013.01);
(Continued)

(58) Field of Classification Search
CPC . C10G 69/04; C10G 1/06; C10G 1/08; C10G 3/40; C10G 3/46; C10G 3/50;
(Continued)

(56) References Cited

U.S. PATENT DOCUMENTS 5,478,370 A * 12/1995 Spangler ................. C01B 3/384
252/373
8,492,600 B2 7/2013 Marker et al.
(Continued)

FOREIGN PATENT DOCUMENTS

WO 2016/009333 A1 1/2016

OTHER PUBLICATIONS

Ochoa et al. ("Implications of feeding or cofeeding bio-oil in the fluid catalytic cracker (FCC) in terms of regeneration kinetics and energy balance." Energy 209 (2020) 118467) (Year: 2020).*
(Continued)

*Primary Examiner* — In Suk C Bullock
*Assistant Examiner* — Jason Y Chong
(74) *Attorney, Agent, or Firm* — Shook, Hardy & Bacon L.L.P.

(57) ABSTRACT

A method may include: hydropyrolyzing a bio feedstock in a hydropyrolysis unit to produce at least a hydropyrolysis oil; introducing at least a portion of the hydropyrolysis oil with a hydrocarbon co-feed into a fluidized catalytic cracking unit; and cracking the hydropyrolysis oil in the fluidized catalytic cracking unit to produce at least fuel range hydrocarbons.

18 Claims, 1 Drawing Sheet

(51) Int. Cl.
*C10G 3/00* (2006.01)
*C10G 11/04* (2006.01)
*C10G 11/18* (2006.01)

(52) U.S. Cl.
CPC .............. *C10G 3/60* (2013.01); *C10G 11/04* (2013.01); *C10G 11/18* (2013.01); C10G 2300/1014 (2013.01); C10G 2300/1059 (2013.01); C10G 2300/107 (2013.01); C10G 2300/1074 (2013.01); C10G 2300/1077 (2013.01); C10G 2300/4006 (2013.01); C10G 2300/4012 (2013.01); C10G 2400/02 (2013.01); C10G 2400/04 (2013.01); C10G 2400/08 (2013.01)

(58) Field of Classification Search
CPC . C10G 3/52; C10G 3/60; C10G 11/04; C10G 11/18; C10G 2300/1014; C10G 2300/1059; C10G 2300/107; C10G 2300/1074; C10G 2300/1077; C10G 2300/4006; C10G 2300/4012; C10G 2400/02; C10G 2400/04; C10G 2400/06; C10G 2400/08; C01B 2203/0233; C01B 2203/065; C01B 3/34; B01J 23/8872; B01J 21/005; Y02P 30/20
See application file for complete search history.

(56) References Cited

U.S. PATENT DOCUMENTS

| | | | |
|---|---|---|---|
| 9,102,888 B2 | 8/2015 | Freel et al. | |
| 9,102,889 B2 | 8/2015 | Freel et al. | |
| 9,102,890 B2 | 8/2015 | Freel et al. | |
| 9,109,177 B2 | 8/2015 | Freel et al. | |
| 9,120,988 B2 | 9/2015 | Freel et al. | |
| 9,120,989 B2 | 9/2015 | Freel et al. | |
| 9,120,990 B2 | 9/2015 | Freel et al. | |
| 9,127,223 B2 | 9/2015 | Freel et al. | |
| 9,127,224 B2 | 9/2015 | Freel et al. | |
| 9,969,942 B2 | 5/2018 | Freel et al. | |
| 10,167,429 B2 | 1/2019 | Urade et al. | |
| 10,174,259 B2 | 1/2019 | Urade et al. | |
| 10,190,056 B2 | 1/2019 | Urade et al. | |
| 10,563,130 B2 * | 2/2020 | Narayanaswamy | C10G 1/06 |
| 10,570,340 B2 | 2/2020 | Freel et al. | |
| 10,633,606 B2 | 4/2020 | Freel et al. | |
| 10,640,719 B2 | 5/2020 | Freel et al. | |
| 2010/0256428 A1 * | 10/2010 | Marker | C10G 3/46 |
| | | | 585/240 |
| 2012/0232299 A1 | 9/2012 | Bartek et al. | |

OTHER PUBLICATIONS

Stummann et al. ("Catalytic Hydropyrolysis of Biomass Using Molybdenum Sulfide Based Catalyst. Effect of Promoters." Energy Fuels 2019, 33, 2, 1302-1313) (Year: 2019).*

Jafri, Y., et al., "Multi-aspect evaluation of integrated forest-based biofuel production pathways: Part 1. Product yields & energetic performance", Energy, vol. 166, pp. 401-413 (2019).

Resende, F.L.P., "Recent advances on fast hydropyrolysis of biomass", Catalysis Today, vol. 269, pp. 148-155 (2016).

Stummann, M.Z., et al., "Catalytic hydropyrolysis of biomass using supported CoMo catalysts—Effect of metal loading and support acidity", Fuel, IPC Sience and Technology Press, vol. 264, pp. 1-13 (2020).

International Search Report and Written Opinion received for PCT Patent Application No. PCT/US2022/081346, dated Apr. 18, 2023, 12 pages.

* cited by examiner

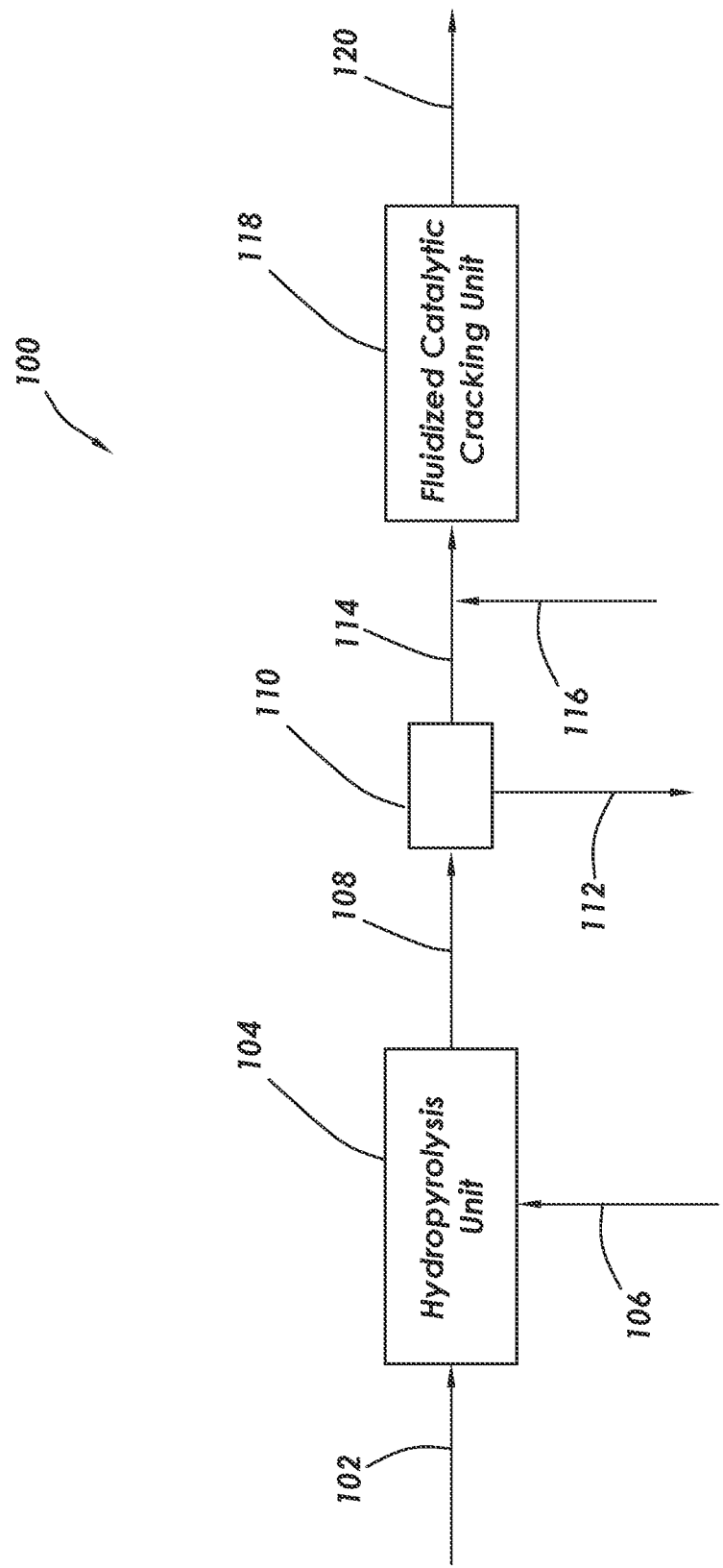

SYSTEM AND METHODS FOR RENEWABLE FUELS

FIELD

This application relates to processes and systems for producing renewable fuels from biomass using low pressure hydropyrolysis and fluidized catalytic cracking.

BACKGROUND

Biomass can be converted to bio-oil through thermochemical conversion processes such as fast pyrolysis, catalytic pyrolysis, hydropyrolysis, and hydrothermal liquefaction, for example. Fast pyrolysis process is a commercially proven technology for producing bio-oil, however, the quality of fast pyrolysis bio-oil (FPO) is poor and the oxygenate content usually measures greater than 30% by mass necessitating further treatment to remove the oxygen. While there has been some success in co-processing FPO in fluidized catalytic cracking (FCC) at commercial scale, the gasoline yield is significantly decreased, and coke and gas yield significantly increased when FPO co-processing content is higher than 10% of the feed to the FCC reactor.

High pressure hydropyrolysis has been developed to overcome these limitations whereby biomass is first pyrolyzed at high pressure (>2 MPa) hydrogen conditions with a catalyst to generate a pyrolysis oil with an oxygenate content of less than 10% by mass. Thereafter, the pyrolysis oil is hydroprocessed at high pressure to form gasoline and diesel products. However, the high pressure hydropyrolysis reactor is costly to design, build, and operate and the hydrogen consumption for the high pressure hydropyrolysis process is very high.

SUMMARY

Disclosed herein is an example method including: hydropyrolyzing a bio feedstock in a hydropyrolysis unit to produce at least a hydropyrolysis oil; introducing at least a portion of the hydropyrolysis oil with a hydrocarbon co-feed into a fluidized catalytic cracking unit; and cracking the hydropyrolysis oil in the fluidized catalytic cracking unit to produce at least fuel range hydrocarbons.

Disclosed herein is a further method including: hydropyrolyzing a bio feedstock with hydrogen in a hydropyrolysis unit to produce at least a hydropyrolysis oil, wherein the bio feedstock comprises lignocellulosic biomass and wherein the hydropyrolysis unit is operated at a pressure in a range of about 0.1 MPa to about 1 MPa; introducing a feed to a fluidized catalytic cracking unit, wherein the feed comprises the hydropyrolysis oil and a hydrocarbon-cofeed, wherein the hydropyrolysis oil is present in the feed in an amount of about 1 wt. % to about 50 wt. %; and cracking the hydropyrolysis oil in fluidized catalytic cracking unit to produce at least fuel range hydrocarbons.

Further disclosed herein is a system including: a hydropyrolysis unit configured to accept a hydrogen stream and a bio feedstock stream and hydropyrolyze the bio feedstock at a pressure in a range of about 0.1 MPa to about 1 MPa to produce at least a hydropyrolysis oil; and a fluidized catalytic cracking unit configured to accept the hydropyrolysis oil and a hydrocarbon co-feed and crack the hydropyrolysis oil to produce at least fuel range hydrocarbons.

These and other features and attributes of the disclosed processes and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawing, wherein:

The FIGURE is an illustrative depiction process for producing fuel range hydrocarbons from hydropyrolysis oil from a bio feedstock in accordance with some embodiments.

DETAILED DESCRIPTION

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

Disclosed herein are processes and systems for producing fuel range hydrocarbons from bio feedstocks using low pressure hydropyrolysis and fluidized catalytic cracking. As used herein, fuel range hydrocarbons means hydrocarbons with carbon numbers from C4 to C20. In example embodiments, fuel range hydrocarbons include gasoline range hydrocarbons, jet range hydrocarbons, and diesel range hydrocarbons. In example embodiments, gasoline range hydrocarbons include paraffins, naphthenes, and aromatics with carbon numbers from 4 to 12 (C4-C12) and isomers thereof. Specifications for gasoline are found in ASTM D4814 "Standard Specification for Automotive Spark-Ignition Engine Fuel" Revision 21B published 2021. In example embodiments, jet range hydrocarbons include paraffins, naphthenes, and aromatics with carbon numbers from 9 to 16 (C9-C16) and isomers thereof. Specifications for jet fuel are found in ASTM D1655 "Standard Specification for Aviation Turbine Fuels" Revision 21B published Oct. 1, 2021. In example embodiments, diesel range hydrocarbons include paraffins, naphthenes, and aromatics with carbon numbers from 12 to 20 (C12-C20) and isomers thereof. Specifications for diesel fuel are found in ASTM D975 "Standard Specification for Diesel Fuel" Revision 21 published in 2021. The process described herein is versatile and example embodiments are suitable for producing fuel range hydrocarbons from many different grades and sources of biomass. Further, the process described herein are selective to hydrocarbons in the gasoline, jet, and diesel ranges, which result in increased product yield as compared to hydroprocessing of pyrolysis oil or other processes for producing fuel range hydrocarbons from pyrolysis oil. The example processes described herein include several unit operations including producing hydropyrolysis oil (HPO) from a bio feedstock followed by co-processing of the HPO with a vacuum gas oil (VGO) in a fluidized catalytic cracker unit (FCCU) to produce the fuel range hydrocarbons. Example embodiment further include fractionating the fuel range hydrocarbons to the corresponding gasoline range hydrocarbons, jet range hydrocarbons, and diesel range hydrocarbons.

There may be several potential advantages to the methods and systems disclosed herein, only some of which may be alluded to in the present disclosure. As discussed above, current techniques for producing fuel range hydrocarbons from pyrolysis oil may be problematic due to the low quality of pyrolysis oil used in co-feeding VGO to an FCCU. The low quality of the pyrolysis oil limits the amount of pyrolysis oil that can be co-fed to the FCCU without increasing the coke product yield which affect the heat balance and heat integration of the FCCU. The hydropyrolysis methods described herein provide a scalable process with improved kinetics and selectivity to fuel range hydrocarbons allowing for a greater fraction of an FCCU feed to be replaced by HPO without the typical problems associated with pyrolysis oil in FCCU.

Embodiments of the methods and systems described herein include bio feedstock as a starting material. Examples of suitable bio feedstocks include any naturally occurring macromolecules, including, without limitation, lignocellulosic biomass, celluloses, hemicelluloses, polysaccharides, pectins, lignins, chitins, proteins, algae, and combinations thereof. Some non-limiting examples of suitable bio feedstocks include, but are not limited to, plant biomass, wood biomass, wood pulp, sawdust, paper products, agricultural products, agricultural trimmings, agricultural residues, crops, food waste, bamboo, bagasse, sugarcane, cotton stalks, corn stalks, Jathropha trimmings, palm plants, coconut shells, municipal waste which includes lignin and/or food waste, cardboard, algae bodies soy oil, canola oil, camelina oil, olive oil, macadamia oil, sunflower oil, rapeseed (canola) oil, soybean oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, rice bran oil, algae oil, and combinations thereof.

In embodiments, the bio feedstock is in any suitable form for the hydropyrolysis process. In some embodiments the bio feedstock is in the form of particles, a slurry, a liquid, or a combination thereof. In some embodiments, the bio feedstock is pretreated, for example, by reducing an average particle size of the bio feedstock. The bio feedstock is pretreated by removing components of the bio feedstock such as contaminants including non-carbon containing components such as inorganics. In some embodiments, the bio feedstock is pretreated by slurrying the bio feedstock, for example with an oleaginous or aqueous fluid to produce a bio feedstock slurry.

In some embodiments, a first step in the process includes conversion of the bio feedstock to a hydropyrolysis oil in a hydropyrolysis reactor. The bio feedstock and a hydrogen stream are introduced into the hydropyrolysis reactor containing a hydropyrolysis catalyst at conditions suitable to cause the bio feedstock to hydropyrolyze. In embodiments, hydropyrolysis products include, without limitation, hydropyrolysis oil, water, carbon dioxide, carbon monoxide, methane, ethane, propane, and char. In embodiments, the bio feedstock is converted in any suitable manner including in a continuous manner whereby bio feedstock is continuously introduced to the hydropyrolysis reactor such as by a screw auger, pump, carrier gas or any other suitable method. Alternatively, or in addition to, the bio feedstock is converted in the hydropyrolysis reactor in a batch manner whereby the bio feedstock is loaded into the reactor in batches to process to hydropyrolysis oil.

In some embodiments, a reactor suitable for hydropyrolysis can be utilized including a bubbling fluidized bed reactor. In embodiments, hydrogen is introduced into the hydropyrolysis reactor at conditions suitable to bubble a hydropyrolysis catalyst bed such that the catalyst remains within the hydropyrolysis catalyst bed while entraining the hydropyrolysis products produced by the hydropyrolysis reaction. In some embodiments, the hydropyrolysis catalyst fines produced in the hydropyrolysis reactor are entrained in the hydrogen. In embodiments, hydropyrolysis catalyst is continuously or intermittently refilled into the hydropyrolysis catalyst bed to replace hydropyrolysis catalyst lost as fines.

Examples of suitable conditions the hydropyrolysis reactor is operated at include at a temperature in a range of from 300° C. to 600° C. and a pressure in a range of 0.1 MPa to 2 MPa. Alternatively, at a temperature in a range of from 350° C. to 600° C., 400° C. to 600° C., 500° C. to 600° C., 550° C. to 600° C., 400° C. to 500° C., 400° C. to 550° C., or any ranges therebetween. Alternatively, at a pressure in a range of from 0.1 MPa to 0.3 MPa, 0.1 MPa to 0.2 MPa, 0.1 MPa to 0.3 MPa, 0.3 MPa to 0.5 MPa, 0.5 MPa to 0.7 MPa, 0.7 MPa to 1 MPa, 1 MPa to 1.5 MPa, 1.5 MPa to 2 MPa, or any ranges therebetween. Examples of weight hourly space velocity (WHSV) in (g bio feedstock)/(g hydropyrolysis catalyst)/hr are in the range of from 0.1 $h^{-1}$ to 10 $h^-$. Alternatively, from 1 $h^{-1}$ to 10 $h^-$, 3 $h^{-1}$ to 10 $h^-$, 5 $h^{-1}$ to 10 $h^-$, 7 $h^{-1}$ to 10 $h^-$, 9 $h^{-1}$ to 10 $h^-$, 0.1 $h^{-1}$ to 10 $h^-$, 0.1 $h^{-1}$ to 10 $h^-$, or any ranges therebetween. The hydropyrolysis reaction is typically a rapid process where the residence time of the bio feedstock in the reactor is less than 1 minute. Alternatively, the reactor residence time is less than 30 seconds, less than 10 seconds, or less than 5 seconds.

In embodiments, the operating pressure of the reactor is selected such that a concentration of oxygenates in the hydropyrolysis products, referring to any carbon compound that contains oxygen as part of its chemical structure such as alcohols, ketones, furans and phenols, is relatively high. Generally, oxygenate formation is suppressed at relatively higher hydrogen partial pressure in favor of water formation. Hydropyrolysis oil produced with relatively higher hydrogen pressures forms a relatively higher quality hydropyrolysis oil with a lower oxygenate contamination which can be directly used in hydroprocessing operations such as hydrotreating. Hydropyrolysis oil formed at relatively lower hydrogen pressure typically contains a greater fraction of oxygenates which renders the hydropyrolysis oil unsuitable for hydrotreating without further conditioning to remove the oxygenates. As will be discussed in further detail below, the relatively lower quality hydropyrolysis oil produced at low hydrogen pressure is suitable to replace a portion of a feed to an FCCU without further treatment to remove oxygenates. In some embodiments, the hydrogen pressure is less than 0.3 MPa.

In embodiments, the hydropyrolysis process as described herein produces an oxygenated hydropyrolysis oil. Oxygenated pyrolysis oil includes pyrolysis oils which include 10 wt. % to 60 wt. % of the oxygen present in the original bio feedstock as oxygenate components. Alternatively, from 10 wt. % to 20 wt. %, 20 wt. % to 30 wt. %, 30 wt. % to 40 wt. %, 40 wt. % to 50 wt. %, 50 wt. % to 60 wt %, or any ranges therebetween. In embodiments, the hydropyrolysis oils produced by the present process can directly replace a portion of a feed to an FCCU without further treatment to remove the oxygenates. The particular composition and properties of the hydropyrolysis oil will vary based on a number of factors, including the hydropyrolysis pyrolysis conditions, the pyrolysis technique, and the initial bio feedstock used. In embodiments, the hydropyrolysis oil includes oxygenates, such as alcohols, ketones, furans and phenols.

In embodiments, the hydropyrolysis oil has any suitable API gravity as desired for a particular application. As used herein, the term "API gravity" is a measure of how heavy or light an oil is as compared to water as measured in accordance with ASTM D4052. In some embodiments, the hydropyrolysis oil has an API gravity of 0 to 40. Alternatively, from 0 to 10, from 10 to 20, from 20 to 30, from 30 to 40, or any ranges therebetween.

In some embodiments, the hydropyrolysis oil has a final boiling point of 600° C. or less. As used herein, the final boiling point is the temperature at which the highest boiling point compounds evaporate as determined in accordance with ASTM 2887. In some embodiments, the hydropyrolysis oil has a final boiling point of 400° C. to 600° C., 450° C. to 600° C., 500° C. to 600° C., 550° C. to 600° C., 400° C. to 550° C., 450° C. to 550° C., 450° C. to 500° C., or 500° C. to 550° C.

In some embodiments, the hydropyrolysis oil has a kinematic viscosity at 40° C. ("KV40") of 10 centistokes (cSt) or less. As used herein, the terms "kinematic viscosity at 40° C." or "KV40" of an oil refers to the kinematic viscosity at 40° C. as measured in accordance with ASTM D445.

The hydropyrolysis oil can contain a number of contaminants at elevated levels making it unsuitable for further processing, such as hydrotreatment, to produce more valuable products. For example, the hydropyrolysis oil can contain nitrogen, chlorides, metals and oxygenates in levels that makes further processing challenging. In some embodiments, the hydropyrolysis oil has a total nitrogen content of 10,000 weight parts per million (wppm) or less. For example, the pyrolysis oil (wppm) includes a total nitrogen content of 100 wppm to 10,000 wppm, 100 wpm to 3000 wppm, 3000 wppm, to 5000 wppm, or 5000 wppm to 10,000 wppm, or any ranges therebetween. As used herein, the total nitrogen content is the sum of measure of the total nitrogen species in the hydropyrolysis oil, as determined in accordance with ASTM D5762. In some embodiments, the hydropyrolysis oil has a total chlorides content of 5000 wppm or greater. For example, the recycle pyrolysis oil has a total chlorides content of 100 wppm to 1000 wppm, 1000 wppm to 2000 wppm, 2000 wppm to 3000 wppm, 3000 wppm to 4000 wppm, 4000 wppm to 5000 wppm, or any ranges therebetween. As used herein, the total chlorides content is the sum of measure of the total chlorides (organic and inorganic) in the hydropyrolysis oil, as determined in accordance with ASTM D7359.

In embodiments, hydropyrolysis catalysts include any hydropyrolysis catalysts suitable to catalyze the hydropyrolysis reactions. Hydropyrolysis catalysts include those which have a metal disposed on a support. In embodiments, the hydropyrolysis catalyst includes one or more metals selected from cobalt, molybdenum, nickel, tungsten, ruthenium, platinum, palladium, iridium and iron, chromium, seaborgium, osmium, rhodium, and combinations thereof. In embodiments, the support includes metal oxide supports such as those which contain alumina, silica, titania, cerin, zirconia, spinel ($MgAlO_4$), as well as binary oxides such as silica-alumina, silica-titania and coria-zirconia. In embodiments, metals are present in a range of from 0.05 wt % to 75 wt. In embodiments, additional elements such as phosphorous, boron, and nickel are also included in the hydropyrolysis catalysts. In embodiments, hydropyrolysis catalysts are prepared by any suitable method including, but are not limited to co-precipitation of the metals and the support from a solution, homogeneous deposition precipitation of the metals on the support, pore volume impregnation of the support with a solution of the metals, sequential and multiple pore volume impregnations of the support by a solution of the metals including a drying or calcination step carried out between successive pore volume impregnations, and co-mulling of the support with a solution or a powder containing the metals, for example.

In some embodiments, the hydropyrolysis catalyst includes a sulfided catalyst. The hydropyrolysis catalysts are subjected to a sulfidation step to convert at least a portion of the metals into their sulfided form. In some embodiments, the hydropyrolysis catalysts are subjected to a sulfur-containing fluid at elevated temperatures and pressures including liquid hydrocarbons containing sulfur compounds and gaseous streams containing hydrogen sulfide. Typical pressures for sulfidation step range from 0.5 MPa to 10 MPa, while typical temperatures range from 150° C., to 450°.

In some embodiments, a second step in the process includes co-processing the hydropyrolysis oil produced it the first step with a feed to an FCCU. An FCCU is typically configured to catalytically crack long chain hydrocarbons with relatively higher boiling points of 300° C. to 450° C. to lower molecular weight hydrocarbons using a fluidized catalyst in a riser type reactor. In some embodiments, the hydropyrolysis oil is directly introduced into an FCCU. Ire some embodiments, the hydropyrolysis oil can be cracked in the presence of a hydrocarbon co-feed in an FCCU. In embodiments the hydropyrolysis oil from the first step is mixed with a feed to an FCCU in any suitable amount from 1 wt. % to 50 wt. Alternatively, from 1 wt. % to 5 wt. %, 5 wt. % to 10 wt. %, 10 wt. % to 15 wt. %, 15 wt. % to 20 wt. %, 20 wt. % to 25 wt. %, 25 wt. % to 35 wt. %, 35 wt. % to 50 wt. %, or any ranges therebetween. The hydropyrolysis oil and the hydrocarbon co-feed can be combined at any suitable ratio. In embodiments, the hydropyrolysis oil and the hydrocarbon co-feed are combined at a hydropyrolysis oil and hydrocarbon co-feed weight ratio of 1:100 to 1:1.5, including, but not limited to weight ratios of about, 1:50 to 1:1.5, 1:25 to 1:1.5, 1:20 to 1:1.5, 1:100 to 1:5, 1:100 to 1:4, 1:100 to 1:10, 1:50 to 1:5, or 1:20 to 1:5. In addition, where combined with a co-feed, the mixture of the hydropyrolysis oil and the hydrocarbon co-feed is combined in a feed to the FCCU at any suitable ratio, including a weight ratio of the mixture to steam of 1:0.1 to 1:2 (e.g., 1:0.1 to 1:0.5, 1:0.75 to 1:0.5, or 1:1 to 1:0.5).

The hydropyrolysis oil can be admixed before or after introduction into the FCCU to yield a mixed feed that is then cracked. In embodiments, hydrocarbon co-feeds include any of a variety of FCCU feeds that can be cracked in an FCCU, Examples of suitable hydrocarbon co-feeds include, but are not limited to, ethane, propane, butane, asphaltenes, resid (e.g., atmospheric resid, vacuum resid), pitch, crude oil, naphtha, gas oil (e.g., vacuum gas oil, heavy gas oil), liquefied petroleum gas, condensate, one or more other hydrocarbons, or combinations thereof. In some embodiments, there may be more than one hydrocarbon co-feed, for example, a first hydrocarbon co-feed is combined with the hydropyrolysis oil for cracking while a second hydrocarbon co-feed is simultaneously cracked in the same (or a different FCCU) while segregated from the hydropyrolysis oil. The second hydrocarbon co-feed that is segregated may the same or different than the first hydrocarbon co-feed that is combined with the hydropyrolysis oil. For example, the first hydrocarbon co-feed combined with the hydropyrolysis oil can be a heavier hydrocarbon liquid (e.g., VGO) than the second hydrocarbon co-feed (e.g., butane, naphtha) that is segregated.

The FIGURE is illustrative of an embodiment of present process for producing fuel range hydrocarbons from hydropyrolysis oil from a bio feedstock. In the FIGURE, process 100 begins with introducing bio feedstock 102 into hydropyrolysis unit 104. Hydropyrolysis unit 104 include any suitable hydropyrolysis reactors such as a bubbling fluidized bed reactor containing any of the previously discussed hydropyrolysis catalysts. Bio feedstock 102 includes any of the previously discussed bio feedstocks, including those which contain woody biomass and lignocellulosic materials. Hydrogen stream 106 is introduced into hydropyrolysis unit 104 at conditions sufficient to bubble the catalyst bed to facilitate the hydropyrolysis reaction in hydropyrolysis unit 104. Hydrogen stream 106 can be from any source at any purity that can support the hydropyrolysis reactions. In embodiments, hydrogen stream 106 includes a refinery fuel gas stream. Hydrogen stream 106 can also be from steam reforming light hydrocarbons from hydropyrolysis process. Hydropyrolysis product stream 108 containing hydropyrolysis oil as well as other hydropyrolysis products such as char and catalyst fines is withdrawn from hydropyrolysis unit 104 and introduced into separator 110. In separator 110 components of the hydropyrolysis product stream 108 which are not hydropyrolysis oil is separated as stream 112. In embodiments, separator 110 can include hydro cyclones or other means by which to separate solids components of hydropyrolysis product stream 108 such as char and catalyst fines. From separator 110, hydropyrolysis oil stream 114 is combined with hydrocarbon co-feed 116, which includes any of the previously discusses hydrocarbon co-feeds and introduced into fluidized catalytic cracking unit 118. In fluidized catalytic cracking unit 118, the hydropyrolysis oil and hydrocarbon co-feed are catalytically cracked to produce cracked hydrocarbon products. The cracked hydrocarbon products are further processed, for example by distillation, to produce fuel stream 120 which can include gasoline range hydrocarbons, jet range hydrocarbons, and/or diesel range hydrocarbons as discussed above.

Any type of reactor suitable for hydropyrolysis is utilized including a bubbling fluidized bed reactor. In embodiments, hydrogen is introduced into the hydropyrolysis reactor at conditions suitable to bubble a hydropyrolysis catalyst bed such that the catalyst remains within the hydropyrolysis catalyst bed while entraining the hydropyrolysis products produced by the hydropyrolysis reaction. Hydropyrolysis catalyst fines produced in the hydropyrolysis reactor may also be entrained in the hydrogen. In embodiments, hydropyrolysis catalyst is continuously or intermittently refilled into the hydropyrolysis catalyst bed to replace hydropyrolysis catalyst lost as fine Additional Embodiments Accordingly, the present disclosure may provide processes and systems for producing fuel range hydrocarbons from bio feedstocks using low pressure hydropyrolysis and fluidized catalytic cracking. The methods and systems may include any of the various features disclosed herein, including one or more of the following statements.

Statement 1. A method comprising: hydropyrolyzing a bio feedstock in a hydropyrolysis unit to produce at least a hydropyrolysis oil; introducing at least a portion of the hydropyrolysis oil with a hydrocarbon co-feed into a fluidized catalytic cracking unit; and cracking the hydropyrolysis oil in the fluidized catalytic cracking unit to produce at least fuel range hydrocarbons.

Statement 2. The method of statement 1 wherein the bio feedstock comprises lignocellulosic biomass.

Statement 3. The method of any of statements 1-2 wherein the bio feedstock comprises oxygenated compounds and wherein the hydropyrolysis oil has an oxygen content less than 30%, less than 20%, less than 15%, less than 10%, or less than 8% on dry basis.

Statement 4. The method of any of statements 1-3 wherein the hydropyrolysis unit comprises a bubbling fluidized bed reactor comprising a hydropyrolysis catalyst.

Statement 5. The method of statement 4 wherein the hydropyrolysis catalyst comprises $NiMo/MgAl_2O_4$.

Statement 6. The method of any of statements 1-5 wherein the hydropyrolysis unit is operated at a pressure in a range of about 0.1 MPa to about 1 MPa.

Statement 7. The method of any of statements 1-6 wherein the hydropyrolysis unit is operated at a temperature in a range of about 300° C. to about 600° C.

Statement 8. The method of any of statements 1-7 wherein the hydrocarbon co-feed comprises at least one hydrocarbon co-feed selected from the group consisting of vacuum gas oil, heavy gas oil, atmospheric residue, vacuum residue, and combinations thereof.

Statement 9. The method of any of statements 1-8 wherein a feed to the fluidized catalytic cracker unit comprises the hydropyrolysis oil in an amount of about 1.0 wt. % to about 50 wt. %.

Statement 10. The method of any of statements 1-9 wherein the fuel range hydrocarbons comprise gasoline range hydrocarbons with carbon numbers from about C4-C12 as determined by ASTM D4814.

Statement 11. The method of any of statements 1-10 wherein the fuel range hydrocarbons comprise jet range hydrocarbons with carbon numbers from about C9-C16 as determined by ASTM D1655.

Statement 12. The method of any of statements 1-11 wherein the fuel range hydrocarbons comprise diesel range hydrocarbons with carbon numbers from about C12-C20 as determined by ASTM D975.

Statement 13. A method comprising: hydropyrolyzing a bio feedstock with hydrogen in a hydropyrolysis unit to produce at least a hydropyrolysis oil, wherein the bio feedstock comprises lignocellulosic biomass and wherein the hydropyrolysis unit is operated at a pressure in a range of about 0.1 MPa to about 1 MPa; introducing a feed to a fluidized catalytic cracking unit, wherein the feed comprises the hydropyrolysis oil and a hydrocarbon-cofeed, wherein the hydropyrolysis oil is present in the feed in an amount of about 1 wt. % to about 50 wt %; and cracking the hydropyrolysis oil in fluidized catalytic cracking unit to produce at least fuel range hydrocarbons.

Statement 14. The method of statement 13 wherein the hydropyrolysis unit comprises a bubbling fluidized bed reactor comprising a hydropyrolysis catalyst.

Statement 15. The method of statement 14 wherein the hydropyrolysis catalyst comprises $NiMo/MgAl_2O_4$.

Statement 16. The method of any of statements 13-15 wherein hydrogen for the hydropyrolyzing is generated by steam reforming of light hydrocarbons.

Statement 17, The method of any of statements 13-16 wherein the hydropyrolysis unit is operated at a temperature in a range of about 300° C. to about 600° C.

Statement 18. The method of any of statements 13-17 wherein the hydrocarbon co-feed comprises at least one hydrocarbon co-feed selected from the group consisting of vacuum gas oil, heavy gas oil, atmospheric residue, vacuum residue, and combinations thereof.

Statement 19. A system comprising: a hydropyrolysis unit configured to accept a hydrogen stream and a bio feedstock stream and hydropyrolyze the bio feedstock at a pressure in a range of about 0.1 MPa to about 1 MPa to produce at least a hydropyrolysis oil; and a fluidized catalytic cracking unit configured to accept the hydropyrolysis oil and a hydrocarbon co-feed and crack the hydropyrolysis oil to produce at least fuel range hydrocarbons.

Statement 20. The system of statement 19 wherein the hydropyrolysis unit comprises a bubbling fluidized bed reactor comprising a hydropyrolysis catalyst.

Statement 21. The system of statement 20 wherein the hydropyrolysis catalyst comprises $NiMo/MgAl_2O_4$.

Statement 22. The system of any of statements 19-21 wherein the hydrocarbon co-feed comprises at least one selected from the group consisting of vacuum gas oil, heavy gas oil, atmospheric residue, vacuum residue, and combinations thereof.

To facilitate a better understanding of the present invention, the following examples of certain aspects of some embodiments are given. In no way should the following examples be read to limit, or define, the entire scope of the disclosure.

Example 1

In this example, beech wood was used to generate fast pyrolysis oil (FPO) and hydropyrolysis oil (HPO). An elemental analysis of the beech wood was performed, the results of which are shown in Table 1.

TABLE 1

|  | C, wt. % | H, wt. % | O, wt. % | Ash, wt. % | Na, mg/kg | K, mg/kg |
|---|---|---|---|---|---|---|
| Content | 44.2 | 6.7 | 46.6 | 1.5 | 60 | 216 |

One FPO run and four HPO experiments we conducted using the conditions shown in Table 2. The FPO run was performed at 0.1 MPa Nitrogen atmosphere with no catalyst while the HPO runs were performed with hydrogen pressures ranging from 0.1 MPa to 2 MPa with $NiMo/MgAl_2O_4$ catalyst. It was found that the yield of feed weight basis for C4+ organics was about 10% lower for the HPO runs than the FPO run. It was further observed that the carbon content for the HPO runs was higher than that for the FPO run and the C4+ organics yield on feed carbon basis for the HPO runs was approximately less than 5% lower than that for the FPO run. It was further observed that increasing hydrogen pressure increased the liquid yield. Further the hydrogen to carbon effective ($H/C_{eff}$) ratios for HPO was much higher than that for FPO indicating that relatively less hydrogen is required for upgrading HPO than FPO.

Example 2

In this Example, the effects of coprocessing FPO and HPO with vacuum gas oil (VGO) in an FCC (fluidized catalytic cracker) pilot plant were evaluated. The HPO used in this example was prepared using atmospheric pressure hydrogen (101.325 kPa), the same as Example 1. The VGO properties were measured and are shown in Table 3 with carbon (C), hydrogen (H), nitrogen (N), oxygen (O), sulfur (S), and (micro carbon residue test) MCRT reported in weight percent. Additionally, a simulated distillation was performed, and the results thereof are shown in Table 4.

TABLE 3

| C | wt % | 86.2 |
|---|---|---|
| H | wt % | 12.3 |
| N | wt % | 0.12 |
| O | wt % | 0.24 |
| S | wt % | 1.23 |
| MCRT | wt % | 0.61 |
| Density at 40° C. | g/cm³ | 0.9008 |

TABLE 4

| SimDis | ° C. |
|---|---|
| IBP | 211.5 |
| 5% | 317.8 |

TABLE 4-continued

| SimDis | ° C. |
|---|---|
| 10% | 347.1 |
| 20% | 378.4 |
| 30% | 399.9 |
| 40% | 417.6 |
| 50% | 433.9 |
| 60% | 451.8 |
| 70% | 471.2 |
| 80% | 495.5 |
| 90% | 529 |
| 95% | 558.8 |
| 99% | 617.2 |
| FBP | 632.6 |

TABLE 2

| | | | Dry Yields (water free) | | | | | |
| | | | C4+ Organics on Feed | C4+ Organics on Feed | C4+ Organic Elemental Analysis (wt %) | | | |
| | Pressure | | | | | | | |
| | (MPa) | Catalyst | Weight Basis | C Basis | C | H | O | $H/C_{eff}$ |
| FPO | 0.1/$N_2$ | none | 43.9% | 54.1% | 54.5% | 5.9% | 39.5% | 0.21 |
| HPO | 0.1/$H_2$ | $NiMo/MgAl_2O_4$ | 32.7% | 50.7% | 68.4% | 7.1% | 24.4% | 0.71 |
| HPO1 | 1/$H_2$ | $NiMo/MgAl_2O_4$ | 35.9% | 57.9% | 71.2% | 7.3% | 21.4% | 0.78 |
| HPO2 | 1.5/$H_2$ | $NiMo/MgAl_2O_4$ | 37.3% | 61.3% | 72.6% | 7.4% | 19.9% | 0.81 |
| HPO3 | 2/$H_2$ | $NiMo/MgAl_2O_4$ | 39.0% | 64.9% | 73.5% | 7.5% | 19.0% | 0.83 |

Three runs with the FCC pilot plant were performed with a constant conversion of 64% for each run. A first run was preformed with VGO alone, a second run with VGO and 10 wt. % FPO, and a third run with VGO and 10 wt. % HPO. The results for each run of the FCC pilot plant are shown in Table 5 in weight percent. It was observed that the co-processing of VGO with 10 wt. % HPO yielded higher greater C5+ liquids than for VGO with 10 wt. % FPO and that the VGO with 10 wt. % HPO yielded results similar to VGO alone. The increase in liquid yield can be attributed to lower gas and coke yields for co-processing HPO versus FPO. It was observed that the coke yield for co-processing 10 wt. % FPO was lower than that of processing VGO alone. This is an unexpected result as relevant literature reports that coke yields are increased with increasing pyrolysis oil co-processing content in FCC feed. The higher coke yield has been reported to be limiting to the amount of pyrolysis oil co-processing due to heat balance in commercial units.

TABLE 5

|  | VGO | VGO + 10 wt. % FPO | VGO + 10 wt. % HPO |
|---|---|---|---|
| $H_2O$ | 0 | 2.3 | 1.9 |
| CO | 0 | 1.7 | 1.5 |
| $CO_2$ | 0.08 | 0.6 | 0.15 |
| $H_2$ | 0.16 | 0.01 | 0.04 |
| Dry gas | 2 | 2 | 1.7 |
| LPG | 14 | 11.9 | 11.1 |
| C5+ Liquid | 77.6 | 73.9 | 78.1 |
| Naphtha | 41.6 | 37.8 | 42.2 |
| LCO | 21.6 | 21.3 | 22.3 |
| MCB | 14.3 | 14.7 | 13.7 |
| Coke | 6.2 | 7.7 | 5.4 |

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially" or and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description are modified by "about" the indicated value, and take into account experimental error and variations that would be expected by a person having ordinary skill in the art.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated

The invention claimed is:

1. A method comprising:
hydropyrolyzing a bio feedstock in a hydropyrolysis unit to produce at least a hydropyrolysis oil, wherein the hydropyrolysis oil has an oxygen content more than 20 wt. % on a dry basis, wherein the hydropyrolysis unit comprises a fluidized bed reactor comprising a hydropyrolysis catalyst, wherein the bio feedstock comprises lignocellulosic biomass, and wherein the hydropyrolysis unit is operated at a pressure in a range of about 0.1 MPa to about 1 MPa;
introducing a feed mixture comprising at least a portion of the hydropyrolysis oil and a hydrocarbon co-feed into a fluidized catalytic cracking unit, wherein the feed mixture to the fluidized catalytic cracking unit comprises the hydropyrolysis oil in an amount of about 5 wt. % to about 15 wt. %; and
cracking the hydropyrolysis oil in the fluidized catalytic cracking unit to produce at least fuel range hydrocarbons.

2. The method of claim 1 wherein the bio feedstock comprises oxygenated compounds and wherein the hydropyrolysis oil has an oxygen content less than 30% on dry basis.

3. The method of claim 1 wherein the fluidized bed reactor is a bubbling fluidized bed reactor.

4. The method of claim 3 wherein the hydropyrolysis catalyst comprises $NiMo/MgAl_2O_4$.

5. The method of claim 1 wherein the hydropyrolysis unit is operated at a temperature in a range of about 300° C. to about 600° C.

6. The method of claim 1 wherein the hydrocarbon co-feed comprises at least one hydrocarbon co-feed selected from the group consisting of vacuum gas oil, heavy gas oil, atmospheric residue, vacuum residue, and combinations thereof.

7. The method of claim 1 wherein the fuel range hydrocarbons comprise gasoline range hydrocarbons with carbon numbers from about C4-C12 as determined by ASTM D4814.

8. The method of claim 1 wherein the fuel range hydrocarbons comprise jet range hydrocarbons with carbon numbers from about C9-C16 as determined by ASTM D1655.

9. The method of claim 1 wherein the fuel range hydrocarbons comprise diesel range hydrocarbons with carbon numbers from about C12-C20 as determined by ASTM D975.

10. A method comprising:
hydropyrolyzing a bio feedstock with hydrogen in a hydropyrolysis unit to produce at least a hydropyrolysis oil, wherein the bio feedstock comprises lignocellulosic biomass, wherein the hydropyrolysis unit is operated at a pressure in a range of about 0.1 MPa to about 1 MPa, wherein the hydropyrolysis oil has an oxygen content more than 20 wt. % on a dry basis, and wherein the hydropyrolysis unit comprises a fluidized bed reactor comprising a hydropyrolysis catalyst;
introducing a feed mixture to a fluidized catalytic cracking unit, wherein the feed comprises the hydropyrolysis oil and a hydrocarbon-cofeed, wherein the hydropyrolysis oil is present in the feed mixture in an amount of about 10 wt. % to about 15 wt. %; and
cracking the hydropyrolysis oil in the fluidized catalytic cracking unit to produce at least fuel range hydrocarbons.

11. The method of claim 1 wherein the fluidized bed reactor is a bubbling fluidized bed reactor.

12. The method of claim 11 wherein the hydropyrolysis catalyst comprises NiMo/MgAl$_2$O$_4$.

13. The method of claim 10 wherein hydrogen for the hydropyrolyzing is generated by steam reforming of light hydrocarbons.

14. The method of claim 10 wherein the hydropyrolysis unit is operated at a temperature in a range of about 300° C. to about 600° C.

15. The method of claim 10 wherein the hydrocarbon co-feed comprises at least one hydrocarbon co-feed selected from the group consisting of vacuum gas oil, heavy gas oil, atmospheric residue, vacuum residue, and combinations thereof.

16. A method comprising:
hydropyrolyzing a bio feedstock in a hydropyrolysis unit to produce at least a hydropyrolysis oil, wherein the hydropyrolysis oil has an oxygen content between about 20 wt. % and 30 wt. % on a dry basis, wherein the hydropyrolysis unit is operated at a pressure in a range of about 0.1 MPa to about 1 MPa, wherein the hydropyrolysis unit comprises a fluidized bed reactor comprising a hydropyrolysis catalyst, and wherein the bio feedstock comprises lignocellulosic biomass;
introducing a feed mixture comprising at least a portion of the hydropyrolysis oil and a hydrocarbon co-feed into a fluidized catalytic cracking unit, wherein the feed mixture to the fluidized catalytic cracking unit comprises the hydropyrolysis oil in an amount of about 5 wt. % to about 15 wt. %; and
cracking the hydropyrolysis oil in the fluidized catalytic cracking unit to produce at least fuel range hydrocarbons.

17. The method of claim 16, wherein the hydrocarbon co-feed comprises at least one hydrocarbon co-feed selected from the group consisting of vacuum gas oil, heavy gas oil, atmospheric residue, vacuum residue, and combinations thereof.

18. The method of claim 16, wherein the hydropyrolysis unit comprises a bubbling fluidized bed reactor comprising a hydropyrolysis catalyst.

* * * * *